United States Patent [19]

Frey

[11] Patent Number: 4,528,719

[45] Date of Patent: Jul. 16, 1985

[54] CASING SIZING MEANS AND METHOD

[75] Inventor: Paul H. Frey, La Grange, Ill.

[73] Assignee: Union Carbide Corporation, Danbury, Conn.

[21] Appl. No.: 507,005

[22] Filed: Jun. 23, 1983

[51] Int. Cl.³ .............................................. A22C 11/02
[52] U.S. Cl. ........................................... 17/49; 17/41; 53/576
[58] Field of Search .................. 17/41, 42, 49; 53/576

[56] References Cited

U.S. PATENT DOCUMENTS

| 4,064,673 | 12/1977 | Gerigk et al. | 17/41 X |
| 4,202,075 | 5/1980 | Michel et al. | 17/41 |
| 4,321,728 | 3/1982 | Marz | 17/41 |

Primary Examiner—Willie G. Abercrombie
Attorney, Agent, or Firm—Roger Aceto

[57] ABSTRACT

An expandable casing sizing means including a pair of elements which can be implanted within an unstretched portion of the casing. The elements are arranged for manipulation through the wall of the casing for expanding the effective diameter of the sizing means to a size greater than the diameter of the unstretched portion of casing.

12 Claims, 4 Drawing Figures

CASING SIZING MEANS AND METHOD

BACKGROUND OF THE INVENTION

The present invention relates to a sizing means and method for sizing a flexible tubular food casing during the stuffing thereof. In particular, the present invention relates to an expandable sizing means together with a method for using the sizing means.

Automatic and semiautomatic systems for stuffing food casings with a variety of food products are well known in the meat packing industry.

For production of encased products on a fully automatic basis, shirred casing is used. Shirred casing is a relatively long continuous length of casing of up to 200 feet or more which is shirred to a much shorter length. Other stuffing operations may use shorter, cut lengths of casing which are not shirred.

It is also common to use a casing sizing means in connection with the stuffing of relatively large casings which, for example, may range between 50 and 200 millimeters in diameter. These casings have a relatively thick wall, often reinforced with a fiberous web. The stuffing of these larger casings is often facilitated by diametrically stretching the casing just prior to stuffing.

Sizing means as may be used to diametrically stretch the casing perform several important functions. For example, stretching the casing to a correct diametrical size during the stuffing operation facilitates production of a stuffed casing product having a relatively uniform diameter throughout its length. This diametrical stretching can be accomplished by longitudinally passing the casing over stationary sizing means and allowing the sizing means to stretch the casing to a predetermined diameter. This stretched casing diameter is related to the manufacturer's recommended stuffed diameter for a given unstretched casing size and is, or is near to, the final diameter of the stuffed product.

The friction between the longitudinally moving casing and stationary sizing means also creates an amount of drag or hold-back force on the casing. While this drag or hold-back, in part, contributes to the final diameter of the stuffed casing product, hold-back also determines the extent to which the casing is filled. In general, the greater the hold-back or drag on the casing, the more fully and tightly packed the casing with food product.

While diametrical sizing and holdback is desired to provide a uniform, fully stuffed encased product, there are times during the stuffing operation when the casing should be relatively free of the drag or hold-back force created by the sizing means. For example, during automatic stuffing operations using the larger sizes of casing, it is periodically necessary to provide an amount of casing slack, as when the stuffing apparatus is operated to gather and close the casing around the ends of the stuffed product. Reducing the drag or hold-back force on the casing in order to produce an amount of casing slack facilitates the gathering and closing operation.

Sizing means as used in the stuffing of larger sizes of casing have either a fixed diameter as shown, for example, in U.S. Pat. Nos. 4,007,761 and 4,335,488 or an adjustable diameter as shown in U.S. Pat. Nos. 3,457,588 and 4,202,075. The latter type, in turn, can comprise elements which are integral components of the stuffing apparatus (U.S. Pat. No. 3,457,588) or they can be attachable to the stuffing apparatus (U.S. Pat. No. 4,202,075).

The present invention is an expandable sizing means of the type which is readily attachable to the stuffing apparatus. Moreover, the sizing means can be expanded to a casing stretching size by manipulation of the sizing means directly through the casing wall. This facilitates use of the sizing means in that it can be easily implanted into a casing in a collapsed or unexpanded state and then later expanded to a casing stretching size.

Thus the sizing means of the present invention lends itself to sale either as a component of a casing article (casing plus sizing means) or as a separate item. For example when sold as a component of a casing article, preferably together with a shirred casing length, the sizing means is simply implanted into an unshirrred portion of the casing and the casing closed over the sizing means. Since, in its collapsed state, the diameter of the sizing means is preferably smaller than the diameter of the unshirred, unstretched casing, the sizing means can be easily inserted into the unshirred casing portion.

In use, the sizing means is manipulated through the casing wall and expanded to a casing stretching size either before or after the casing article is mounted to the stuffing apparatus.

When sold as a separate item, the sizing means can be used with either shirred or cut lengths of casing. When used with shirred casing the sizing means in its collapsed state could be inserted into the casing and then mounted to the stuffing apparatus or the casing could be loaded onto the apparatus followed by the sizing means. In any event, the shirred casing would be first on the stuffing apparatus since even in a collapsed state, the sizing means would probably not fit within the bore of a shirred casing.

When used with cut lengths of casing the order of mounting to the stuffing apparatus would not be critical since the cut length would preferably fit over the sizing means in its unexpanded condition.

SUMMARY OF THE INVENTION

The present invention can be characterized in one aspect thereof by a method for diametrically expanding a food casing by the steps of:

(a) locating an expandable casing sizing means within an unshirred portion of casing having a substantially unstretched wall, the sizing means having at least two cooperating elements which are movable one with respect to the other to an expanded position wherein the two elements provide an effective diameter which is greater than the diameter of the unshirred, substantially unstretched portion of casing and, while the elements are in the unshirred portion;

(b) manipulating the elements by monuvering them through the wall of the unshirred casing to move the elements one with respect to the other to the expanded position; and (c) fixing the elements one to another at the expanded position to maintain the greater effective diameter during the stuffing of the casing.

In another aspect, the invention can be characterized by a sizing means which comprises a pair of cooperating elements including means for mounting the elements to a stuffing horn assembly. The elements are of a size sufficient to fit within a substantially unstretched casing and are adapted for manipulation through the wall of the casing to move the elements to a set position wherein the elements define an effective diameter greater than the diameter of unstretched casing. Latch means on the elements cooperate to fix the elements at the set position during the stuffing of the casing.

In still another aspect, the sizing means of the present invention can be characterized by (a) an expandable casing sizing element which is adapted to fit within a substantially unstretched portion of casing, the element including an annular base and a flexible, open ended cylindrical wall extending from the base;

(b) a rigid annular disc element arranged for forcible entry through the open end of the cylindrical wall and into the expandable sizing element;

(c) cam means on the rim of the disc and on the inner periphery of the flexible cylindrical wall which cooperate to diametrically expand the wall to set size upon the forcible entry of the disc element into the expandable casing sizing element;

(d) latch means on the elements which snap the elements axially together upon the diametrical expansion of the cylindrical wall to the set size; and (e) both the disc and base having a central opening to accommodate passage of a stuffing horn assembly.

DESCRIPTION OF THE PREFERRED EMBODIMENT

Figure 1:
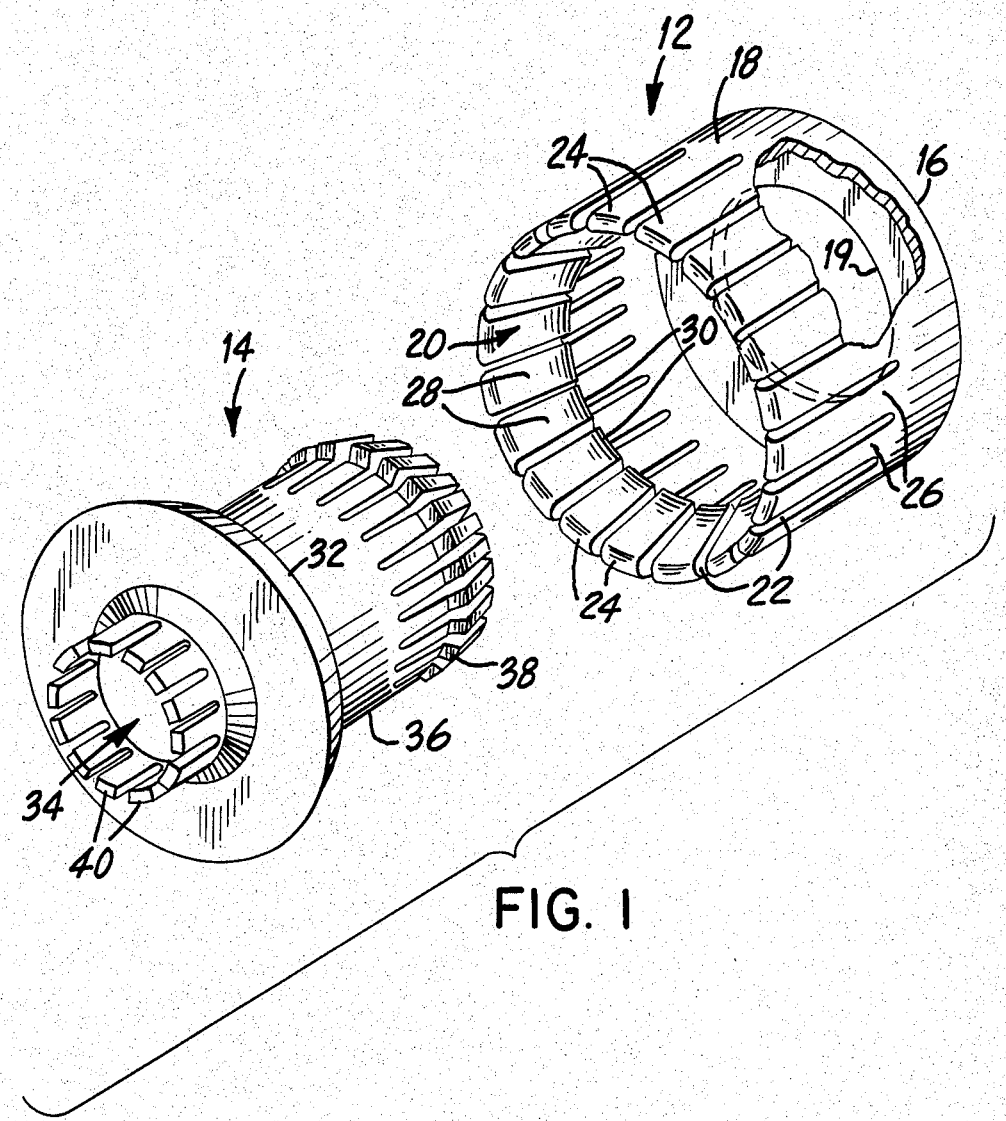
FIG. 1 is a perspective view showing the two elements of the expandable sizing means of the present invention.

Referring to the drawings, FIG. 1 shows that the expandable sizing means of the present invention comprises two interengageble elements including an expandable casing engaging element generally indicated at 12 and a rigid disc element generally indicated at 14.

The expandable casing engaging element 12 is generally the shape of a cylinder having a base 16, a cylindrical wall 18 extending from about the periphery of the base and an open end 20. Base 16 is also provided with a central opening 19, to accommodate passage of a stuffing horn assembly, and to accommodate a latch means of the rigid disc element as further described herein below.

Wall 18 has a plurality of slits 22 which extend longitudinally inward from open end 20. These slits define a plurality of casing engaging sizing fingers 24 which form a diametrically expandable portion of wall 18. In particular, the juncture 26 of each finger with the continuous portion of wall 18, or with base 16 in the event slits 22 extend to the base, forms a flexure point about which the fingers can bend.

Figure 2:
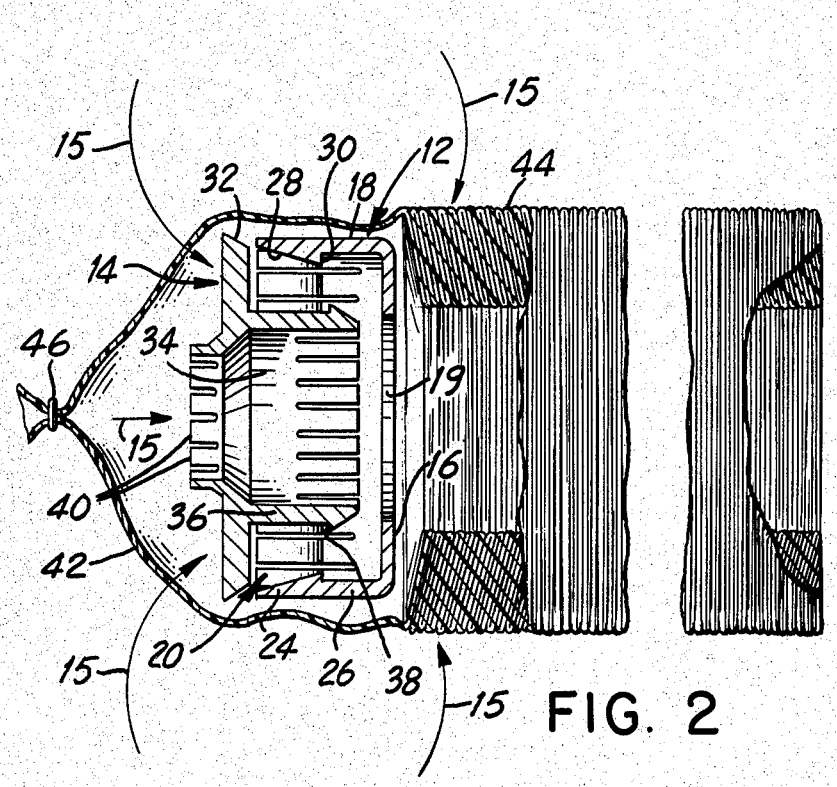
FIG. 2 is a side elevation view, partly broken away, and in section, showing the unexpanded sizing means of the invention implanted within an unshirred portion of a shirred casing.

To complete the structure of casing engaging element 12, the inner periphery of each finger adjacent the open end 20 is provided with a ramped portion 28. This is best seen in FIG. 2. This ramped portion 28 forms a sharp step or detent 30 which can function to latch the casing engaging element 12 and rigid disc element 14 together as set out hereinbelow.

FIG. 1 shows that disc element 14 has a rigid rim 32 which is ramped in a direction generally complementary to the ramped portions 28 of casing engaging element 12. Disc element 14 also has a central opening 34 and extending from about this opening 34, in a rearward direction, is an annular split flange 36. Split flange 36 has a stepped portion or detent 38 formed about its outer periphery which is slightly larger than the diameter of base opening 19. The detent 38 and split flange 36 can effect a snap connection of the two elements 12 and 14 by forcing the flange through base opening 19 so that the detent 38 latches to base 16.

Completing the structure of rigid disc 14 is a latch means formed by a plurality of latching fingers 40 which extend in a forward direction from about opening 34. These fingers 40 provide a latching function to attach the disc element to a stuffing horn assembly.

With reference to FIG. 2, the two elements of the sizing means, that is the expandable casing engaging element 12 and rigid disc element 14, are shown disposed in a partly assembled condition wherein the two elements are nested in axial alignment but are not latched together. In this condition, the effective outer diameter of the expandable casing engaging element 12 is unexpanded or in a relaxed condition.

The two elements as shown are implanted in an unshirred portion 42 of a shirred casing 44 and the unshirred portion is closed over the two elements by a conventional clip closure 46. This works to maintain the two elements of the sizing means implanted within the casing to form what is sometimes referred to herein as a casing article. While the casing article as shown in FIG. 2 includes a shirred casing, it should be appreciated that the casing could also be a cut length, that is, a shorter unshirred length of casing.

As implanted, the effective unexpanded outer diameter of casing engaging element 12 is smaller than the unstretched diameter of unshirred casing as shown in FIG. 2. As a matter of choice, the outer diameter of element 12 could be just slightly greater than the unstretched diameter of the casing so that the two elements 12 and 14 are firmly held within the unshirred portion of the casing.

With the two elements implanted within the casing in this fashion they can be easily manipulated through the wall of the casing to expand the effective diameter of the expandable, casing engaging element to a casing stretching size.

This is done by grasping the outer peripheral portions of the two elements through the wall of the casing and squeezing them together axially as is indicated by arrows 15.

As the two elements come together, the ramped rim 32 of disc element 14 engages the ramped portion 28 of each sizing finger 24. This engagement in turn provides a camming action to flex the sizing fingers 24 outwardly as the disc element 14 is forcibly moved into the expandable, casing engaging element 12. As sizing fingers 24 flex outwardly, the effective diameter of casing engaging element 12 is increased. This increase in effective diameter causes the sizing fingers to engage and stretch the unshirred casing portion 42.

The relative axial movement between the two elements 12 and 14 continues until the split flange 36 extends through base opening 19 and the detents 38 on this flange are latched to the base 16. This firmly locks the two elements together to form an expanded sizing means as is shown in FIG. 3.

Figure 3:
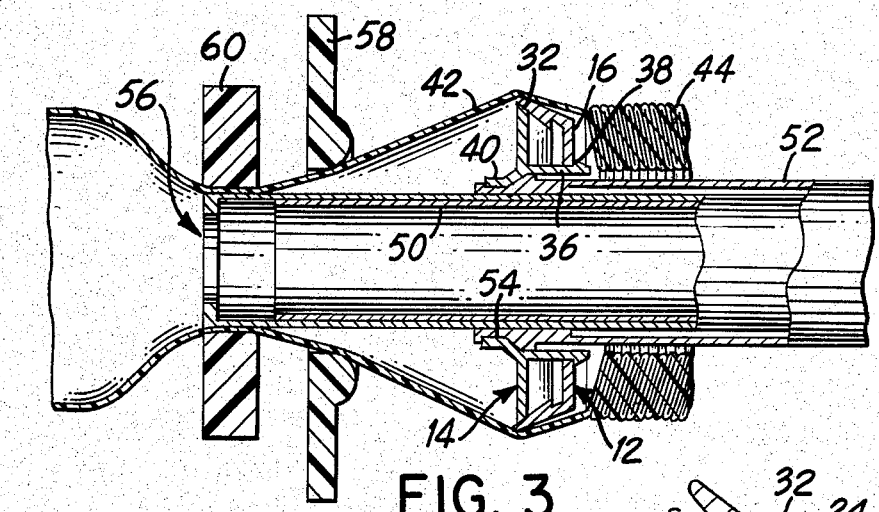
FIG. 3 is a view similar to FIG. 2 only showing the sizing means in an expanded condition and in place on a stuffing apparatus.

FIG. 3 shows the casing article including an expanded sizing means attached to a stuffing horn assembly of an otherwise conventional casing stuffing apparatus of the type shown in U.S. Pat. No. 30390. Since the apparatus itself is well known in the art, only so much of the apparatus is shown as is necessary to illustrate use of the present invention. As used herein, "stuffing horn assembly" is intended to mean the stuffing horn either alone or with other elements. Thus the sizing means as described herein can attach directly to a stuffing horn or to a member associated with the stuffing horn depending upon the make up of the particular stuffing machine being used. For example the stuffing horn assembly of the apparatus of U.S. Pat. No. 30390 would include a stuffing horn 50 and a tension sleeve 52.

The tension sleeve is slidable along the stuffing horn in order to provide casing slack during the step of gathering and closing the casing over the ends of the encased product as mentioned hereinabove. The sizing means of the present invention, preferably is fixed to the tension sleeve. This is accomplished by the snap engagement of latching fingers 40 into an appropriate groove 54 on the end of the tension sleeve. Thus the casing article as shown in FIG. 2 is mounted to the stuffing apparatus by sliding the article, casing first, over the discharge end 56 of the stuffing horn assembly and pushing on the sizing means until the latch fingers 40 of the rigid disc snap into groove 54. A snubbing ring 58 and an emulsion sealing ring 60, which are also conventional parts of a stuffing apparatus, are moved away from the discharge end 56 to permit this installation. For a further understanding of the operation of snubbing ring 58, reference is made to U.S. Pat. No. 4,164,057. Emulsion seal ring such as shown at 60 is also clearly described in this U.S. Patent.

With reference to FIGS. 2 and 3, the expansion of the sizing means to a casing stretching size was described as occurring prior to mounting the casing article to the stuffing apparatus, that is off of the stuffing horn assembly. However it should be appreciated that grasping and squeezing the two elements 12, 14 axially together can occur after loading the article onto the stuffing horn assembly. Also if sufficient resistance is applied to the aft end of the casing article, the act of pushing on the rigid disc 14 through the casing at the fore end of the article to effect the attachment to the tension sleeve, can cause the expansion of the sizing fingers 24. Thus, in this case, the expansion to a casing stretching size would occur during the act of mounting the article to the stuffing horn assembly.

In any event, once the detents 38 on rigid disc 14 latch through opening 19 to the base 16 of the expandable casing engaging element 12, the two elements are firmly locked together to provide a casing sizing means which has an effective diameter greater than the diameter of unstretched casing.

Another feature of the present invention is that it can be expanded to either of two casing stretching sizes. The first, and smaller, size is provided by the latched position of element 12 and 14 as shown in FIG. 3. A second, and larger, size is provided by the latched position as shown in FIG. 4.

Figure 4:
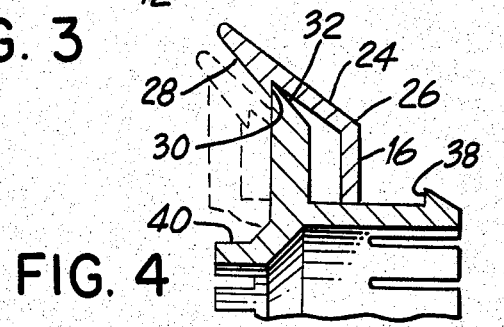
FIG. 4 shows a portion of the sizing means on an enlarged scale in a further expanded condition.

In FIG. 4 the squeezing together of the two elements 12, 14 has not stopped with the detents 38 snapped to base 16. Instead rigid disc 14 is forced into a deeper engagement with the expandable casing element until the detents 30 on the ramped portion 28 of sizing fingers 24 snap engage over the rim 32 of rigid disc 12. This locks the two elements together at a larger effective diameter rather than at a smaller effective diameter as shown in dotted line in FIG. 4. Thus the same two elements 12, 14 can be used in either of two given sizing configurations.

Materials of construction for making the two elements of the expandable sizing means according to the present invention are preferably plastics such as polypropylene or high density polyethylene. Nylon may be used. Spring stainless steel may also be used to fabricate the parts, it being necessary only that whatever material is selected have the degree of flexibility and resilience required for the hereinabove described operations and functions.

The expandable sizing means of the present invention is exemplified by utilizing at least two cooperating components which can be manipulated through the wall of the casing to effect a diametrical expansion of the sizing means. The particular sizing means as described herein expands responsive to such manipulation which produces a longitudinal or axial movement of one component with respect to another. However, it should be appreciated that manipulation through the casing wall to effect expansion can be accomplished by other arrangements of sizing means components. For example, a copending application U.S. Pat. Ser. No. 521,589, filed Aug. 9, 1983 shows an arrangement wherein the sizing means components are manipulated through the casing wall to rotate one component with respect to another. These rotatable components are congruent ovals or eccentrically mounted members which are rotated out of congruency to a casing stretching position.

The foregoing description is intended to be illustrative only, it being understood that numerous alternative modes of the invention, but well within its spirit, will occur to persons familiar with the art. It is, therefore, intended that the foregoing description be not construed in any limiting sense but that the invention be defined in terms of the appended claims.

Having thus described the invention in detail, what is claimed as new is:

1. A method for diametrically expanding a food casing with an expandable internal sizing means which, when expanded, engages against the inner surface of unshirred casing, said method comprising the steps of:
   a. locating an unexpanded casing sizing means within an unshirred portion of casing having a substantially unstretched wall, said sizing means having at least two cooperating elements which are movable one with respect to the other to a pre-set expanded position wherein said elements provide an effective diameter greater than the diameter of said substantially unstretched casing; and, while said elements are within said unshirred portion
   b. manipulating said elements by maneuvering them through the wall of said unshirred portion of casing to move said elements, one with respect to another to said expanded position; and
   c. fixing said elements one to another only upon attainment of said expanded pre-set position to maintain the increased effective diameter of said sizing means during the stuffing of said casing.

2. A method as in claim 1 including closing said unshirred portion of casing over said sizing means, and said manipulating step (b) to move one of said elements with respect to another is accomplished by manipulating said elements while said sizing means is confined within said closed unshirred portion of casing.

3. A method as in claim 1 wherein said sizing means comprises a pair of coaxial interengageable, generally cylindrical elements including an outer element having an expandable periphery and an inner element having a fixed periphery, said manipulating step and maneuvering being accomplished by moving said inner and outer elements axially one towards another into a forced nesting relationship and utilizing said inner element to diametrically expand the periphery of said outer member, and latching said inner and outer elements one to the other in said forced nesting relationship so as to maintain the periphey of said outer element in an expanded condition.

4. A method as in claim 1 wherein said manipulating step is accomplished while said sizing means is within said unshirred portion of casing and prior to locating said sizing means on a stuffing horn assembly.

5. A method as in claim 1 wherein said manipulating step is accomplished after said sizing means is located on a stuffing horn assembly.

6. A method as in claim 1 including the step of loading said sizing means onto a stuffing horn assembly and wherein said loading step causes said elements to move one with respect to another to said expanded position.

7. Sizing means for use in diametrically stretching a food casing about a stuffing horn assembly and prior to the stuffing of said casing, said sizing means comprising:
   a. at least two cooperating elements including means for mounting said elements to a stuffing horn assembly, said elements being movable one with respect to another to a set position wherein said elements define an effective diameter which is greater than the diameter of unstretched casing;
   b. said elements each being of a size for reception within a portion of casing having a substantially unstretched wall, and said elements being manipulatable through the wall of said casing to move said elements to said set position for contacting and diametrically stretching said casing; and
   c. means on said elements which cooperate to fix said elements one to another only upon attainment of said set position in order to maintain said defined effective diameter during the stuffing of said casing.

8. Sizing means for use in diametrically stretching a food casing about a stuffing horn assembly prior to the stuffing of said casing, said sizing means comprising:
   a. an expandable casing sizing element adapted to fit within a substantially unstretched portion of casing, said element including a base and a flexible, open ended cylindrical wall extending from the periphery of said base, said wall being diametrically expandable to a set size larger than the unstretched diameter of said casing;
   b. a disc element arranged for forcible, axial entry through said open ended cylindrical wall, said disc element having a rigid outer rim engageable with said expandable sizing element to expand said wall to said set size;
   c. said disc element and the base of said casing sizing element each having a central opening to accommodate passage of a stuffing horn assembly, at least one of said elements including attachment means for mounting said one element to said assembly;
   d. cam means on said rigid outer rim and on the inner periphpry of said flexible cylindrical wall which cooperate to diametrically expand said cylindrical wall to said set size upon the forcible, axial entry of said disc into said expandable casing sizing element; and
   e. latch means on said element which snap fit together and connect said elements one to another upon siad flexible cylindrical wall attaining said set size.

9. Sizing means as in claim 8 including a detent on the inner periphery of said cylindrical wall adapted to snap engage over said rim.

10. Sizing means as in claim 8 wherein said cylindrical wall is made up of a plurality of sizing fingers extending longitudinally from about the outer periphery of said base, the connection of each finger to said base being a flexure point to permit said fingers to open outwardly thereby expanding the effective diameter of said cylindrical wall to said set casing stretching size.

11. Sizing means as in claim 10 including a ramped portion on an inner surface of the said sizing fingers, said ramped portion being engagable with the rigid outer rim of said disc upon the forcible entry of said disc into said expandable casing sizing element, said ramped portion comprising said cam means on said expandable casing sizing element.

12. Sizing means as in claim 8 wherein said expandable casing sizing element and said disc element are disposed in an unlatched condition within an unstretched portion of casing and including a closure means closing said unstretched portion of casing over said elements to maintain said elements implanted within said unstretched casing portion.

* * * * *